United States Patent [19]
Gebelein et al.

[11] Patent Number: 5,704,707
[45] Date of Patent: Jan. 6, 1998

[54] MOTORCYCLE SAFETY HELMET SYSTEM

[75] Inventors: Rolin Gebelein, Santa Cruz; Donald Varner, Hollister; James J. Snyder, Soquel; James Parsons, Santa Cruz, all of Calif.

[73] Assignee: Blue Sky Research, Inc., Santa Cruz, Calif.

[21] Appl. No.: 674,317

[22] Filed: Jul. 1, 1996

[51] Int. Cl.$^6$ ................................................ F21L 15/14
[52] U.S. Cl. .................... 362/106; 362/72; 362/802; 340/479
[58] Field of Search .................... 362/72, 106, 276, 362/802; 340/468, 479

[56] References Cited

U.S. PATENT DOCUMENTS

| | | |
|---|---|---|
| 4,956,752 | 9/1990 | Foglietti ................. 362/72 |
| 5,040,099 | 8/1991 | Harris ..................... 362/72 |

*Primary Examiner*—Stephen F. Husar
*Attorney, Agent, or Firm*—LaRiviere, Grubman & Payne

[57] ABSTRACT

A helmet-mounted wireless frequency-modulated infrared beam-actuated auxiliary brakelight system capable of reliable operation in all ranges of ambient light while permitting the rider to turn his head from side to side over a large angle approaching 180 degrees or more. The system comprises a frequency-modulated infrared transmitter, in operative combination with a switch for detecting brake system actuation, and a helmet module, including a frequency-modulated infrared receiver and decoder in operative combination with a stop light. Brake system initiation results in switch actuation which causes the transmitter to emit a beam of frequency-modulated infrared energy towards the helmet module. When the beam is received at the helmet module, it is captured using a lens in operative combination with a novel lightpipe which ensures reception over a 180 degree angle. The infrared energy is then transmitted through a solar filter which further discriminates between solar infrared energy and the infrared beam from the transmitter, before being received at an electro-optical circuit. This circuit decodes the frequency-modulated infrared energy and activates the auxiliary brake lamp.

18 Claims, 8 Drawing Sheets

A  LIGHT PIPE OF PLASTIC MATERIAL (ACRYLIC) WITH BOTH END GROUND TO DIFFUSE AND RECEIVING END BIFURCATED
B  CLAD AND JACKETED OPTICAL LIGHTPIPE WITH BOTH CORE ENDS GROUND DIFFUSE AND RECEIVING END SHAPED TO A CONE
C  ACRYLIC LIGHT PIPE WITH BOTH ENDS GROUND DIFFUSE AND RECEIVING END SHAPED TO TRUNCATED CONE

33 "BUILT IN" INFRARED OPERATED STOP LAMP MODULE
34 HELMET
32 BATTERY COMPARTMENT DOOR
52 MECHANICAL SWITCH
31 VISOR

MOTORCYCLE SAFETY HELMET SYSTEM

TECHNICAL FIELD

The present invention relates to stop lamp systems for vehicle use and, more particularly, to an improved helmet-mounted auxiliary stop lamp system particularly suited for use with a motorcycle or ridden vehicle.

BACKGROUND OF THE INVENTION

All new automobiles sold in the United States have an elevated auxiliary stop lamp for improved visibility and safety, by both night and day. Typically, this elevated auxiliary stop lamp is located centrally on the rear window dash or upper trunk facing rearward and is interconnected directly with the vehicles electrical power system and primary brakelight on/off switching system. There would be an obvious safety advantage for having an elevated helmet mounted rearward facing stop lamp system for motorcycle riders which operates both day and night and is easy for the motorcycle rider to interconnect to the vehicles stopping mechanism without having to dismantle any part of the vehicle or alter the integrity of the brake light system of the vehicle.

U.S. Pat. No. 5,040,099 (hereafter, the "'009 patent") teaches a wireless infrared beam of light connection between the motorcycle brake pedal stoplight operation and a helmet attached auxiliary stop lamp for nighttime-only operation.

The prior art does not teach a methodology for discriminating between the infrared beam transmitted by the infrared emitters of that invention, and the infrared energy component of bright sunlight.

An additional disadvantage is that the embodiments taught in the '009 reference which use an optical fiber coupled detector on the receiver limit the ability of the rider to turn his head from side to side and still have the device operate. This is due to limitations on the acceptance angle of the fiber which is typically less than 70 degrees of angle. Yet another disadvantage is the system's high susceptibility to electro-magnetic interference (EMI), which results in false brakelight operation.

Further disadvantages to this teaching include the facts that the primary brake light system of the motorcycle must be altered in order to install the infrared emitter portion of the system taught therein, and also the safety helmet will likely need to be so altered to install the receiver portion of that system.

There is thus a continuing need to provide improved visible recognition of motorcycle riders when braking which need would be filled by a wireless infrared beam actuated brakelight system which is helmet mounted and operates properly both day and night by having the capability to properly discriminate between sunlight and a brake actuating signal. The device should not require altering either the standard motorcycle brake system or brakelight system for installation. The device should operate effectively even while the rider turns his head over a large angle, approaching 180 degrees or more. Further, the device should be capable of avoiding false brakelight operation, such as is caused by EMI. Moreover, the device should not require altering the motorcycle, or the rider's safety helmet in any permanent or substantial manner.

If the device could be supplied as an after-market item, easily attachable to existing motorcycles and to existing rider safety helmets, the benefits accruing therefrom could be realized by a larger proportion of the motorcycle-riding community than would available from a system which requires such modifications to the motorcycle itself and to the rider's helmet as to limit the availability of the device to purchasers of specific motorcycle/helmet combinations. In the alternative, the device should be capable of incorporation directly into helmets themselves by helmet manufacturers, should such an option be desirable, e.g., for styling or market reasons.

DISCLOSURE OF INVENTION

The disadvantages described above and other disadvantages are overcome by application of the principles of the present invention in providing a wireless infrared beam actuated brakelight system which is helmet mounted, which operates reliably both day and night, and which does not require altering the standard motorcycle brake system nor brakelight system for installation. Indeed, a preferred embodiment of the present invention does not require altering the motorcycle or the rider's safety helmet in any permanent or substantial way whatsoever.

The present invention teaches a helmet-mounted wireless frequency-modulated infrared beam-actuated auxiliary brakelight system which operates properly and reliably in all ranges of ambient light while permitting the rider to turn his head from side to side over a large angle approaching 180 degrees or more. Moreover, the invention taught herein avoids false brake signal operation due to EMI.

The system can be supplied as an after-market item which is easily attached to existing motorcycles and to existing rider safety helmets. However, safety helmet manufacturers should have no trouble incorporating the helmet device directly into the helmet itself. In addition, the device operates effectively even while the rider turns his head over a large angle approaching 180 degrees or more. Further, the system is constructed to avoid false brakelight operation such as caused by EMI.

In order to effect these and other advantages, the present invention teaches both an improved infrared emitter subsystem (the "transmitter") and an improved infrared-receiving helmet subsystem (including the "receiver" and the brakelight). A first feature central to the reliable operation of the present invention is its ability to discriminate between solar IR energy and the IR beam emitted by system's IR transmitter. This is accomplished by FM encoding of the IR signal from the transmitter, coupled with it's subsequent reception, filtration and decoding by the helmet subsystem. After the IR beam is received at the helmet, it is filtered to reject solar IR and then decoded by an FM decoder. In combination these elements markedly reduce or completely eliminate false brakelight actuation occasioned by spurious IR energy.

A second feature which further contributes to the reliable operation of the invention is its use of a novel lightpipe technology which at once greatly increases the degree to which a user is free to move his head while retaining proper system functionality, while simultaneously eliminating false brakelight actuation occasioned by EMI.

The infrared transmitter subsystem taught herein is actuated by a proximity switch which is attachable to a motorcycle brake actuating device, e.g., a hand grip or foot pedal. Actuation of the proximity switch causes current to flow from a power supply through a frequency-modulated (FM) encoder, thence to the IR emitter itself. The use of the FM encoder serves to distinguish the IR beam from the transmitter from the sun's IR energy. Power for the transmitter may be from a power supply internal to the transmitter subsystem, or alternatively, from an external power supply such as the motorcycle's own electrical power system.

The frequency-modulated beam emitted by the transmitter subsystem is directed, by the placement of the transmitter subsystem, toward the helmet subsystem mounted on the user's safety helmet. When the beam strikes a receiver lens mounted on the helmet subsystem, the IR beam is transmitted thence through a lightpipe and a sun filter, which filter further discriminates between the sun's IR and the IR beam from the transmitter, and finally to an FM decoder switch. The FM decoder switch, sensing a proper emission from the transmitter subsystem, activates the helmet-mounted visible stoplight of the helmet subsystem. The combination of the FM-coded IR beam in operative combination with the improved light pipe taught herein, a sun filter, and an FM decoder provides a heretofore unrealized degree of IR discrimination which results in significant improvements in reliable braking indication regardless of solar IR activity.

An additional switch may be added to either or both of the transmitter subsystem or the helmet subsystem to conserve power when the motorcycle is not being ridden. By way of illustration, but not limitation, such switches could include a manual switch, or a switch which detects the presence of the rider or detects motorcycle engine operation.

A preferred embodiment of this invention is presented in the section entitled "BEST MODE OF CARRYING OUT THE INVENTION" and accompanying drawing figures such that these and other objects and features of the present invention are disclosed or made apparent to those skilled in the art.

BRIEF DESCRIPTION OF THE DRAWINGS

For fuller understanding of the present invention, reference is made to the accompanying drawing described in the following detailed description of the Best Mode of Carrying Out the Invention. In the drawing.

Figure 1:
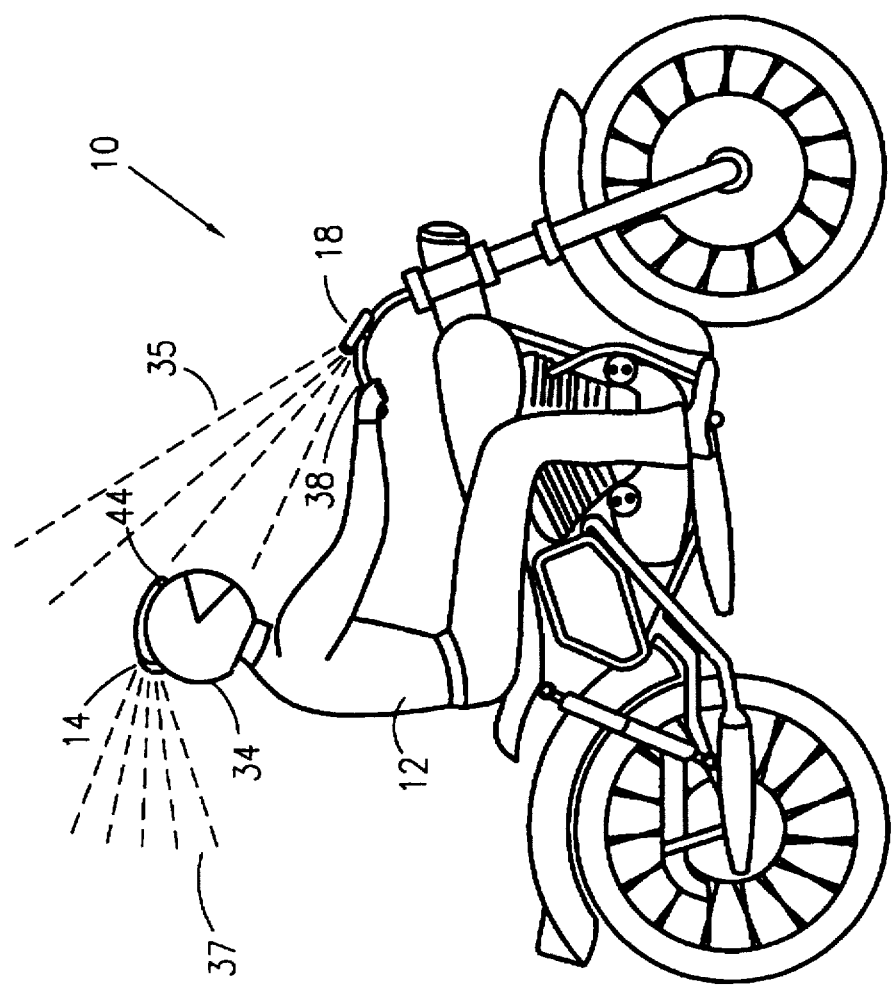
FIG. 1 is a side view of a motorcycle and a rider wearing an improved safety helmet showing the present invention operational.

Reference numbers refer to the same or equivalent parts of the invention throughout the several figures of the drawing.

BEST MODE OF CARRYING OUT THE INVENTION

Referring now to FIG. 1, a side view of a motorcycle 10 and rider 12 wearing helmet 34 to which is affixed a helmet mounted auxiliary stop lamp subsystem 14 is shown. Rider 12 squeezes hand brake lever which simultaneously slows motorcycle 10 and actuates proximity switch 38, thereby energizing infrared emitter 28 causing infrared beam 35 to strike infrared transmitting helmet subsystem receiver lens 44 which turns on helmet mounted auxiliary stop lamp subsystem 14 initiating visible beam 37 of auxiliary stop lamp 56.

Figure 2:
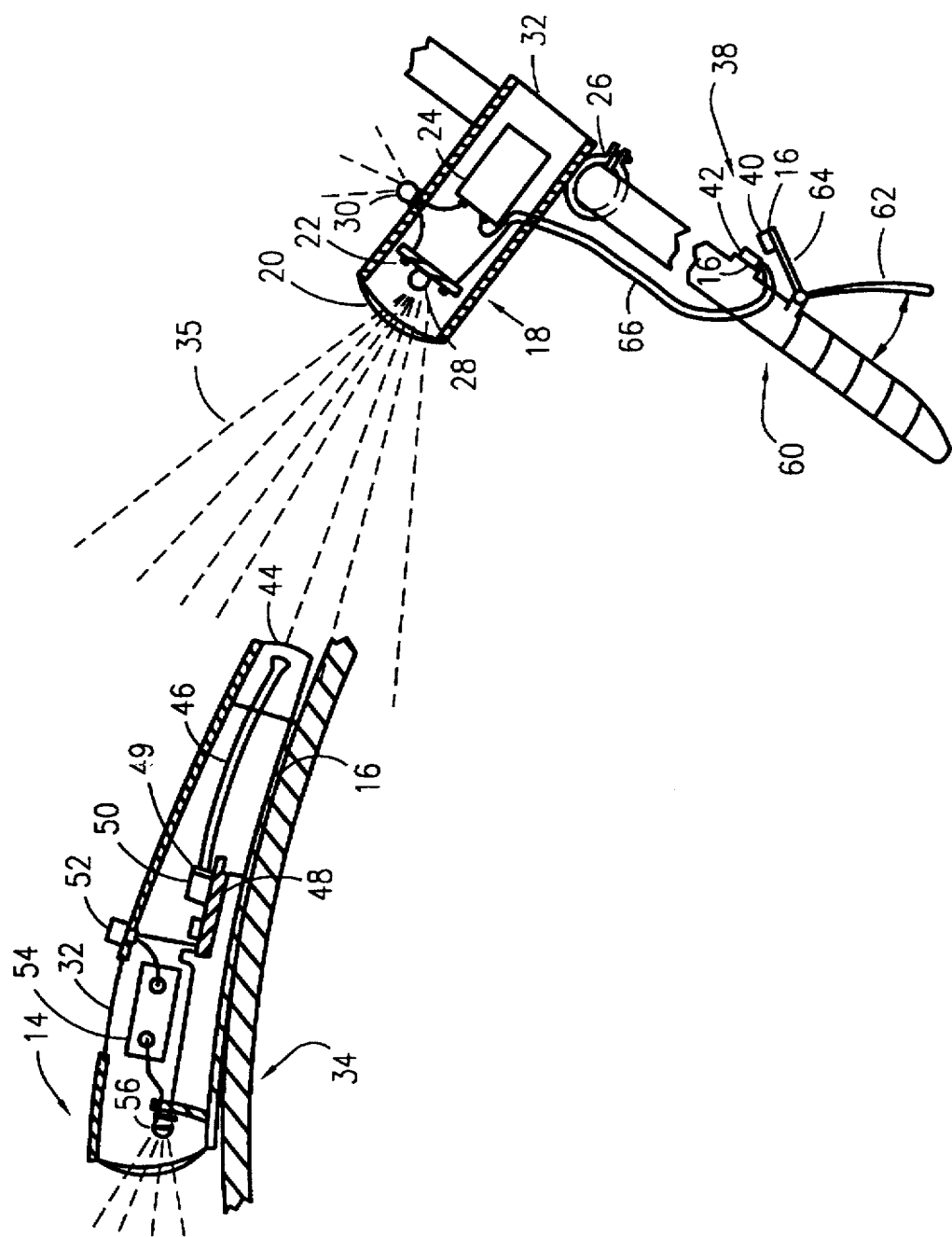
FIG. 2 is a cutaway view showing of the improved infrared transmitter and hand brake operated proximity switch attached to the motorcycle handlebars and of the improved infrared receiver/stop lamp switch of the present invention attached to the rider's safety helmet.

FIG. 2 shows a cutaway view of the improved infrared transmitter subsystem 18 and hand brake operated magnetic proximity switch 38 attached to the motorcycle handlebar hand grip 60, and of the improved helmet mounted stop lamp subsystem (helmet subsystem) 14. Helmet subsystem 14 may be attached to the rider's safety helmet 34 using any of several adhesive or mechanical attachment means well known to those of ordinary skill in the art. A first preferred embodiment of the present invention uses an aggressively adhesive double-sided attachment tape 16.

As rider 12 squeezes hand brake squeeze lever 62 toward handlebar and grip 60 in order to slow motorcycle 10 causing hand brake squeeze lever 62 to remove proximity switch movable magnet 40 from proximity switch fixed portion 42, the proximity switch 38 completes the electrical circuit from battery power supply 24 through proximity switch electrical leads 66 to frequency modulated infrared transmitter electronic encoding circuit 22, thereby energizing both visible indicator light 30 and infrared emitting light emitting diode (LED) 28, which diode shines through infrared transmitting emitter lens 20 thereby forming a beam, 35, of frequency modulated infrared light. In a first preferred embodiment of the present invention, an Optek Model OP293A LED, availble from Optek Inc. of Carrollton, Tex., is employed.

After beam 35 is transmitted from emitter lens 20, it thereafter strikes the infrared transmitting helmet subsystem receiver lens 44, and thereafter strikes the receiving end of infrared transmitting lightpipe 46 before traveling the length of lightpipe 46 and thus through the sunlight rejection filter 49, whereafter it is detected at infrared detector circuit 50 and decoded at frequency modulated infrared receiver decoding and switching circuit 48.

Circuit 48 switches on the visible (red) light emitter (LED) stop lamp 56 provided only that manual switch 52 has been switched on prior to brake operation. Alternatively, manual switch 52 may be replaced with other switching devices, e.g., for detecting any condition indicating vehicle operation including but not limited to helmet wear by the rider, engine operation and the like. Alternatively, switch 52 may be omitted altogether. In a first preferred embodiment, switch 52 is used to activate infrared detector circuit 50 which is powered by a helmet subsystem battery power supply 54, as is the visible (red) light emitter (LED) stop lamp 56 when decoding and switching circuit 48 is switched on. The beam 37 of auxiliary stop lamp 56 shines through stoplight lens 58 indicating instantaneously to drivers behind that motorcycle 10 is slowing. Battery compartment doors 32 disposed on both infrared transmitter subsystem 18 and helmet mounted auxiliary stop lamp subsystem 14 for access in replacing spent power supplies (e.g., batteries) 24 and 54 respectively.

Figure 3:
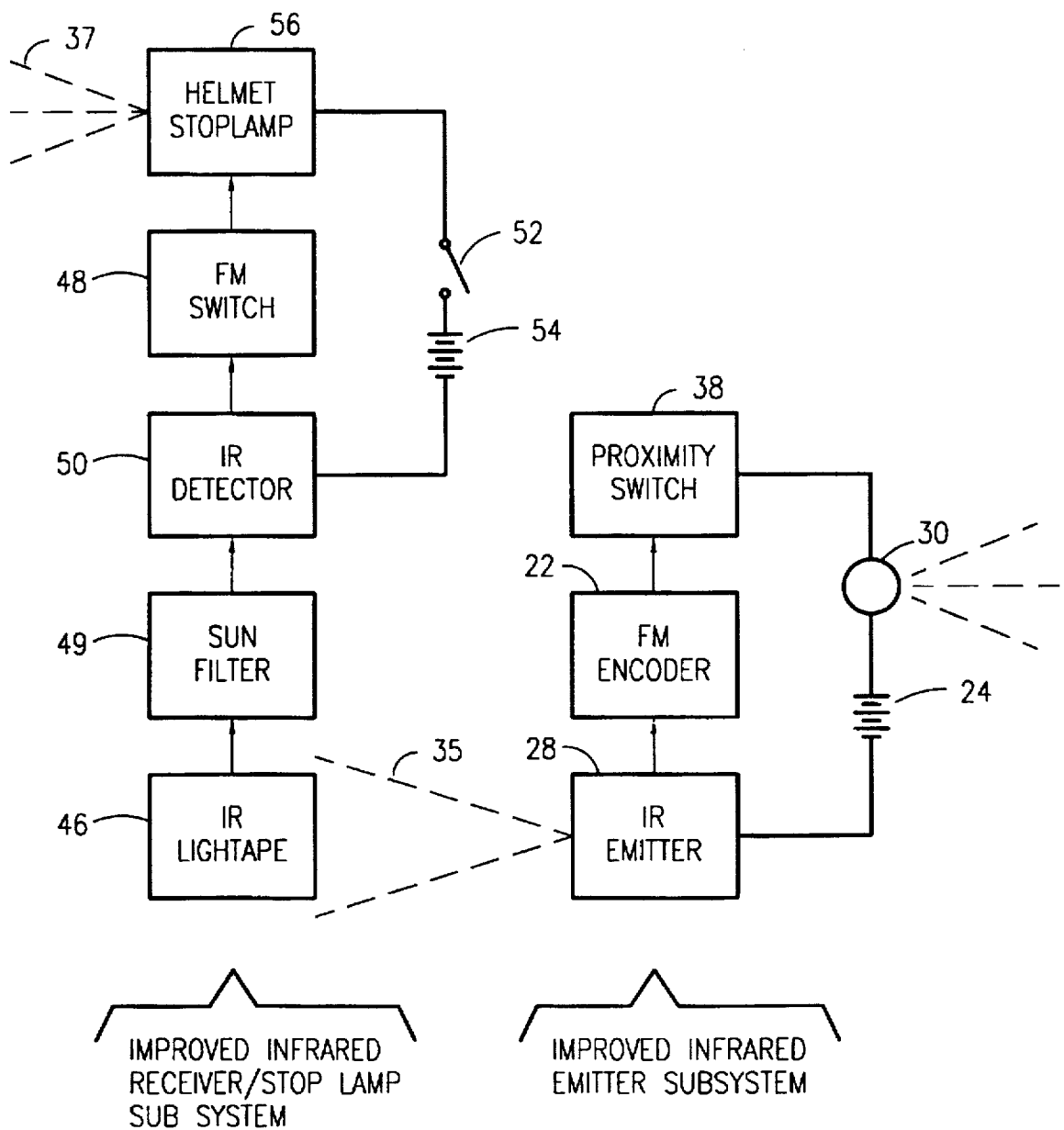
FIG. 3 shows a block diagram of the electro-optical circuits of the improved infrared transmitter subsystem and improved infrared receiver/stop lamp switch subsystem of the present invention.

FIG. 3 depicts a block diagram of the electro-optical circuits of the improved infrared transmitter and improved infrared receiver subsystems in operation. When the brake hand grip (not shown) is activated, proximity switch 38 closes, which completes the electrical circuit from battery 24 through visible indicator light 30 and through FM encoding circuit 22, thence to IR emitter diode 28. IR emitter diode 28 emits IR beam 35, which in turn is received by IR lightpipe 46 of helmet subsystem 14 (not shown) thence through sun rejection filter 49 and IR detector 50 to FM (decoding) switching circuit 48 which turns on helmet stop lamp 56 to emit visible (red) beam 37.

Figure 7:
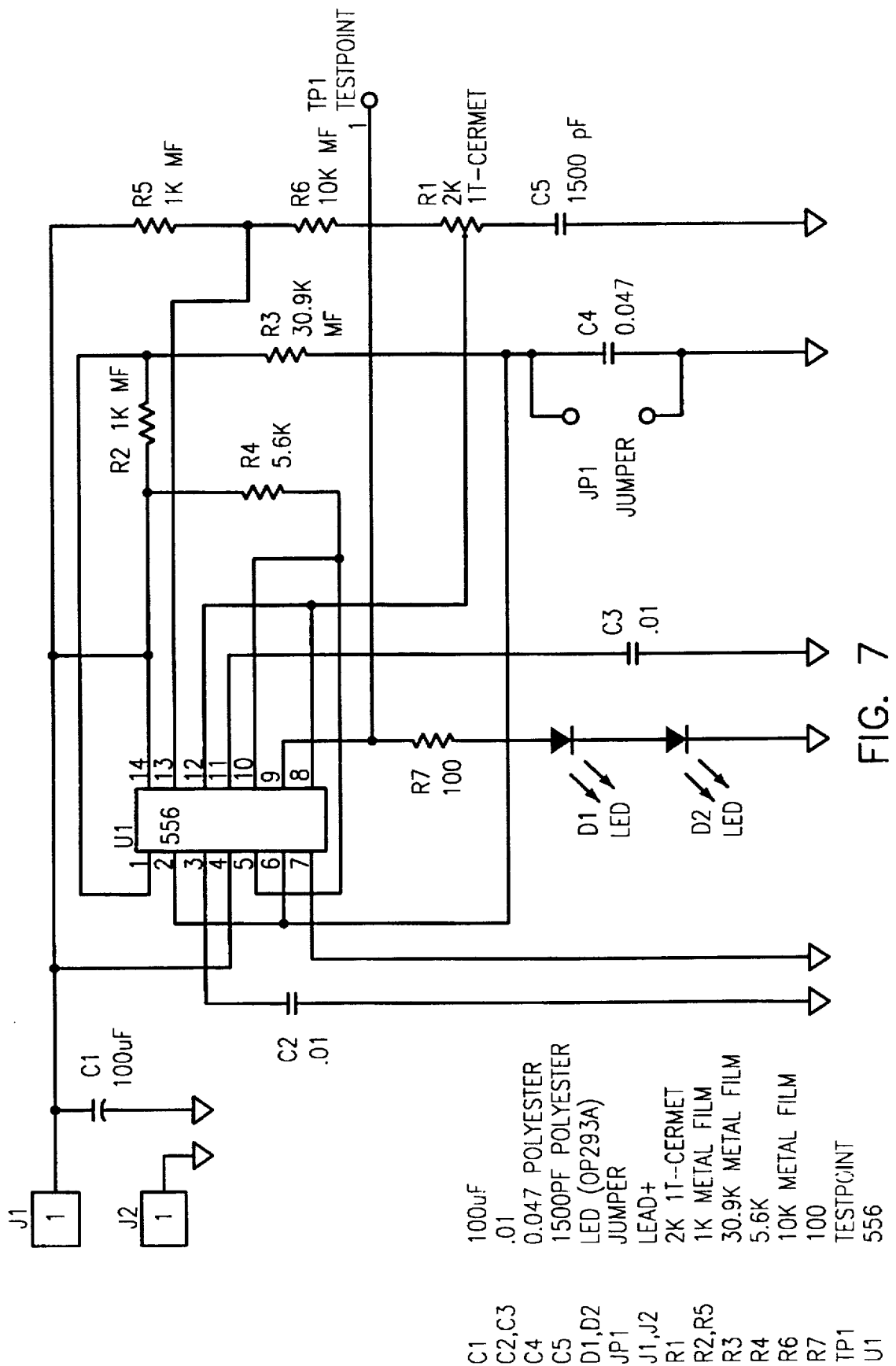
FIG. 7 is a circuit diagram of the transmitter of the present invention.
Figure 8:
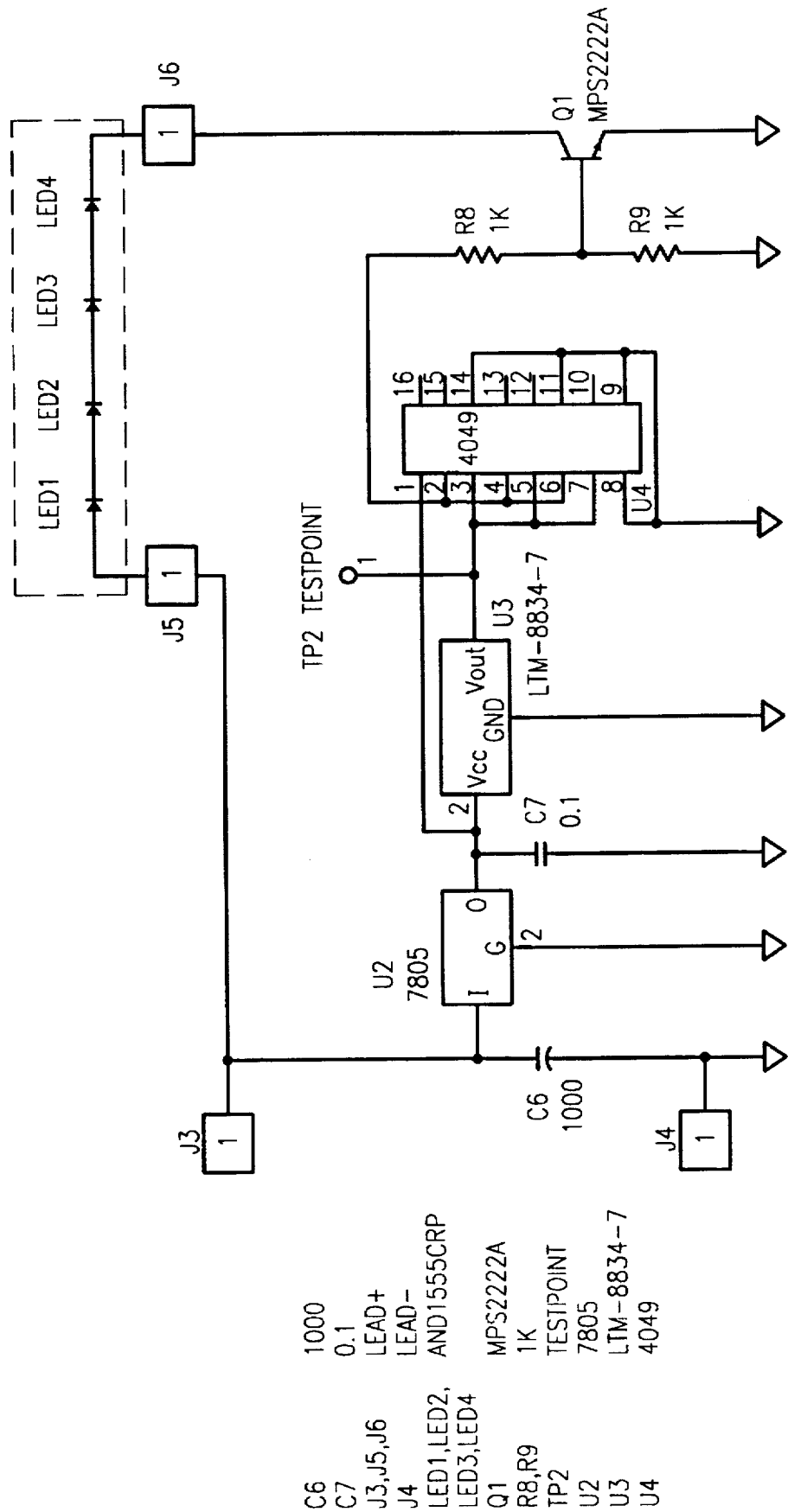
FIG. 8 is a circuit diagram of the receiver of the present invention.

By way of example, but not limitation, the circuit diagrams of the transmitter and receiver as used in a first preferred embodiment of the present invention are shown at FIGS. 7 and 8. Obvious to those of ordinary skill in the art is the fact that alternative encoding and decoding circuitry may, with equal facility, be utilized to implement these functions, and the principles of the present invention specifically contemplate such alternatives.

Figure 4:
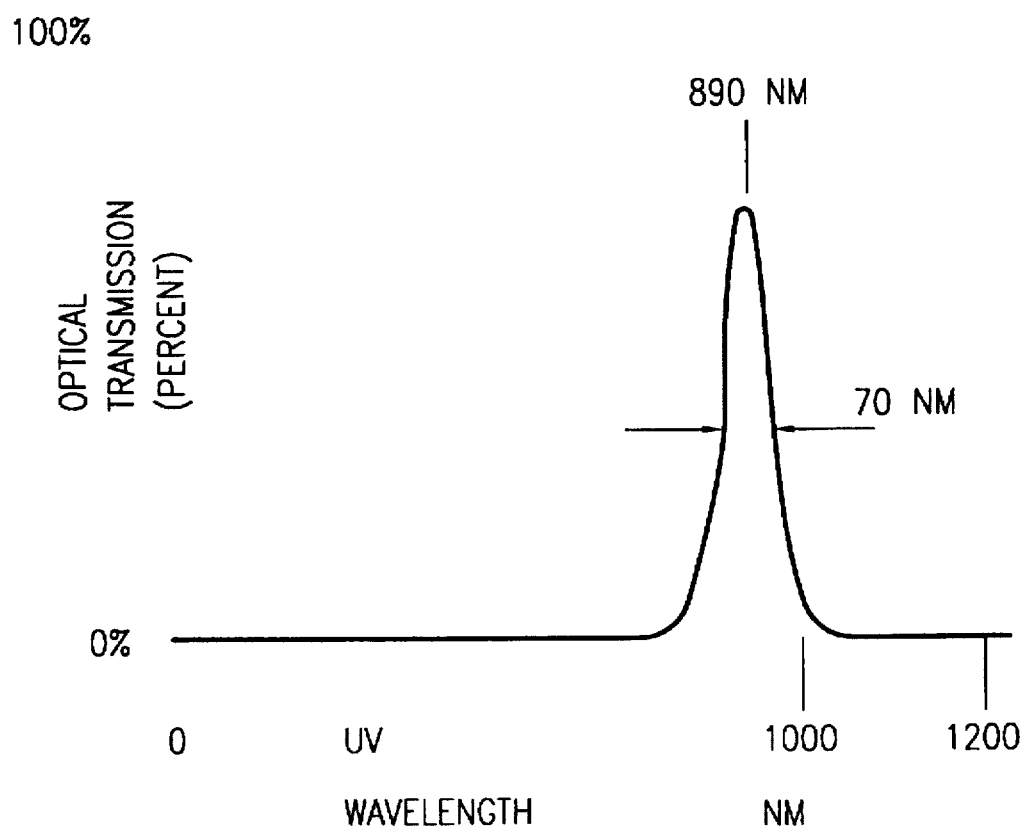
FIG. 4 is a technical description of multilayer infrared optical pass band sunlight rejection filter coating of the present invention.

FIG. 4 is a technical description of a multilayer infrared optical pass band sunlight rejection filter, which will be well understood by those skilled in the art and which can be supplied by CVI Laser Corporation of Albuquerque, N. Mex. Other means of sunlight rejection may be employed, such as absorption filters devised to reject over essentially the same wavelengths uv to about 850 nanometers and also 960 to 1200 nanometers, such as Schott Glass RG9 or Hoya 850 glass filters. While absorption filters have the advantage of being very much less angle sensitive, pass band filters can be built to very much more exacting pass band and rejection specifications, thereby improving their discriminatory capabilities and, hence, overall system reliability.

The sunlight rejection capability of the present invention provides advantages over the prior art in discrimination between the infrared emission of the system infrared emitter and the infrared radiation of sunlight. This is due to the use by the present invention of a frequency modulated (FM) infrared emission to further distinguish the transmitter light from the sun. Greater range and sensitivity to the FM infrared emission is supplied by sun rejection filter 49. On knowledge and belief, these techniques have never before been applied toward improving a motorcycle safety helmet.

Figure 5:
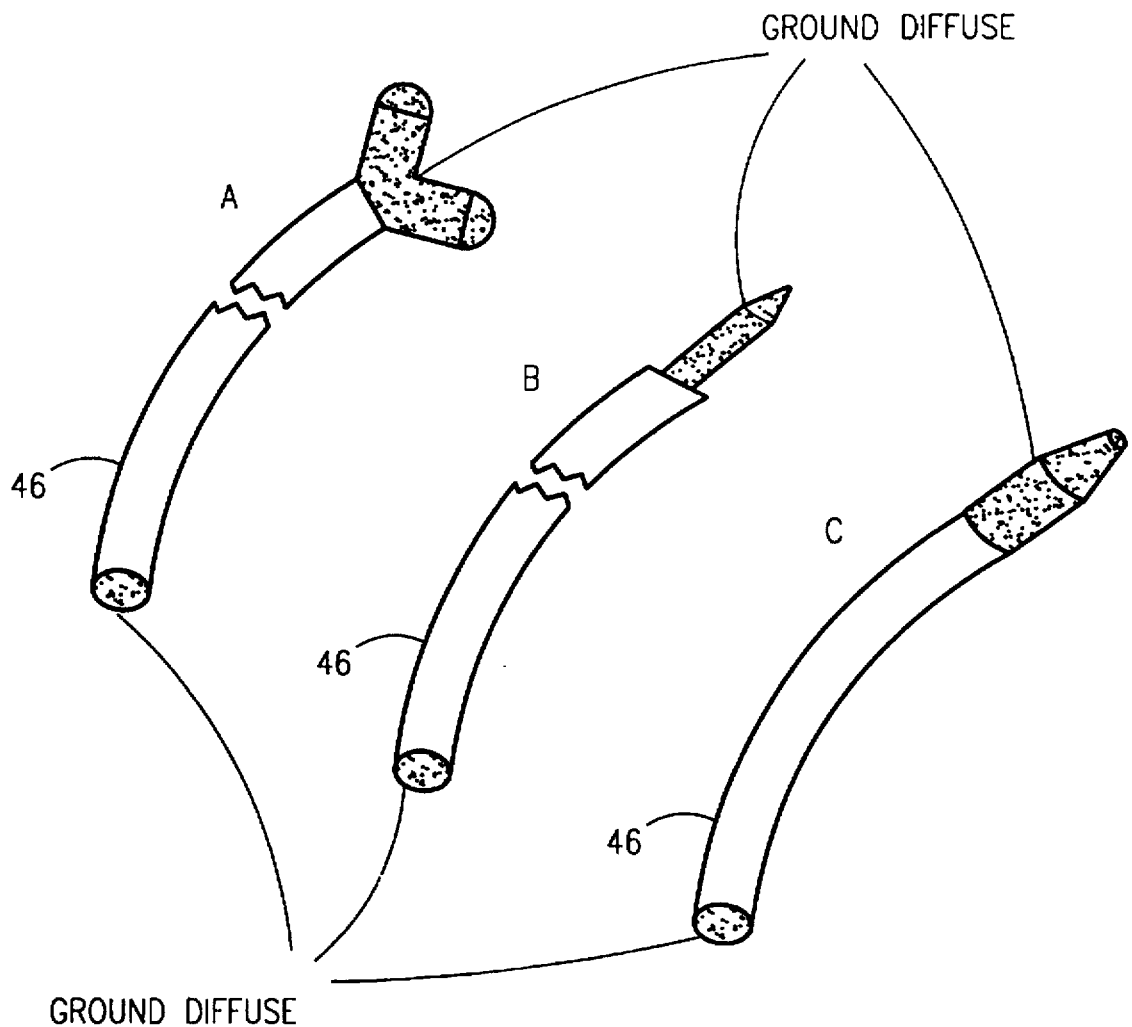
FIG. 5 depicts various lightpipes and end treatments for markedly improving the angle of acceptance of the infrared beam.

FIG. 5 depicts various infrared transmitting lightpipes 46 used in helmet subsystem 14. Lightpipe 46 serves two functions: first, it permits the receiving of emitted IR at a location near the front of the rider's helmet 34. Second, it simultaneously permits IR detector 50 to be located at or very near the rear or top of the helmet 34. The advantage of the second function is that it allows for extremely short electrical leads between the IR detector and the decoding and switching circuit 48. This largely prevents unwanted reception of EMI. This precludes the unwanted flashing or flickering of the stoplight by omnipresent EMI from various and sundry unrelated sources which is common to the system taught by the '009 patent. Connection by long wire leads, as recommended that reference, fails for this reason.

Connection by optical fiber fails for another reason, which is also overcome by the present invention in a novel manner. As is well known in the art, optical fibers have an acceptance (receiving) angle (AA) which is defined mathematically as:

$$AA = 2 \arcsin \sqrt{(N_1)^2 - (N_2)^2} \simeq 65°$$

where $N_1$ and $N_2$=the optical indices of the optical fiber's core and cladding, respectively. It is therefore clear that when such an optical fiber is used, the rider cannot turn his head from side to side more than about 30 degrees from either side of center line when viewing up the road without, for all practical purposes, losing communication with the emitted infrared beam! Accordingly, this prevents the auxiliary helmet mounted stop lamp from being turned on, and constitutes an unacceptable restriction on the rider's head movement. Standard lightpipes also function in this unfortunate manner, and provoke the same unacceptable limitations on head movement.

The present invention employs the novel lightpipe treatments shown in FIG. 5 to overcome the previously-discussed limitations of optical fibers and conventional lightpipes, thereby providing a wide angle of acceptance at the lightpipe. The principles of the present invention, applied to this lightpipe element, result in an angle of acceptance approaching 180 degrees. This in turn enables the lateral angular movement of a rider's head on either side of the center line of almost 90 degrees while maintaining complete communication between the transmitter subsystem and the helmet subsystem. In short, the present invention enables an essentially unlimited range of rider head movement over any normal riding conditions other than absolutely looking over his or her own shoulder. The '009 reference does not even consider such a problem.

Having continued reference to FIG. 5, several lightpipe configurations are disclosed which result in the previously discussed advantages. One such configuration is an acrylic or other such unclad rod as shown in FIGS. 5A and 5C, as well as clad and jacked lightpipes as shown in FIG. 5B. One such clad lightpipe, used in a first preferred embodiment of the present invention, is available from Poly-Optical Products, Inc. of Irvine, Calif. Each of these lightpipe configurations provide the previously discussed super-wide acceptance angle when the receiving ends are bifurcated or cone shaped as shown, but only when this receiving end, and preferably also the exit end, are ground diffuse, as shown in FIG. 5. This is a truly remarkable result, as conventional scientific wisdom in the art has it that any diffusion of the light (as would be occasioned by a less than a specular surface), particularly at the entry surface, but also at the exiting surface, should destroy total internal reflectance (TIR) and consequently excessively diminish transmission. Unexpectedly, is was found during the development of the present invention that exactly the opposite happens: diffuse grinding of at least one end of the lightpipe results in superior transmission over an acceptance angle approaching 180 degrees!

Figure 6:
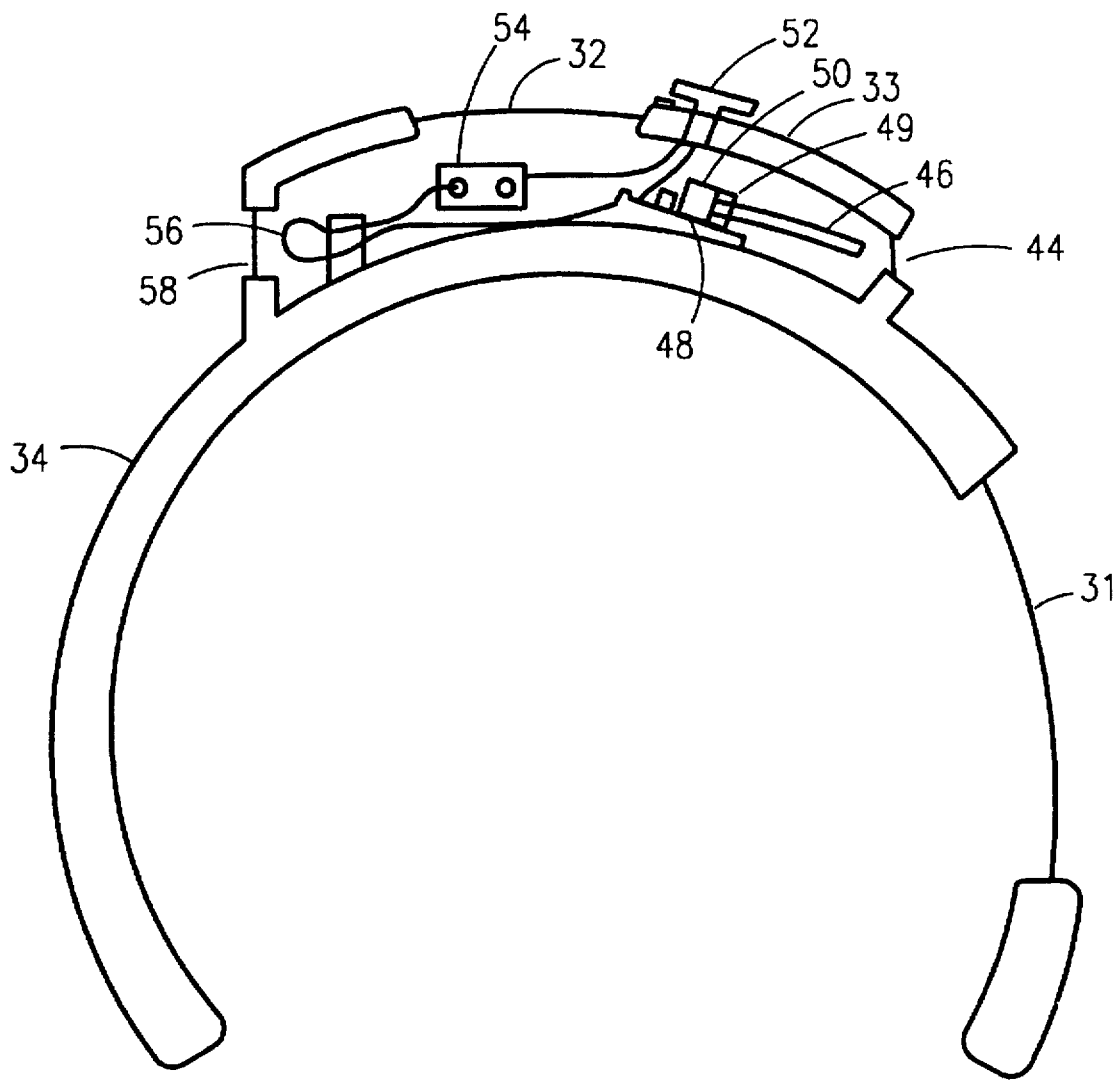
FIG. 6 is a cutaway view showing of the improved infrared receiver/stop lamp switch of the present invention built into a rider's safety helmet directly.

FIG. 6 depicts the principles of the present invention incorporated into a motorcycle safety helmet rather than merely attached to the helmet. Such a construction will permit helmet manufacturers to directly provide improved safety helmets for riders. Of course, only the helmet subsystem 33 would be built into the helmet 34, with the infrared transmitter and proximity switch 38 provided to the user for attachment to the motorcycle, for instance in the handlebar area, substantially as previously described.

The various improvements invented developed and disclosed herein have resulted in a improved motorcycle safety helmet system which truly functions to provide an elevated helmet mounted stop lamp which operates reliably both day and night, no matter how the rider turns his head. The preferred embodiment of the system taught and disclosed herein does not require tampering with the vehicles standard stop lamp system, and is easily applied to a standard helmet and motorcycle, thereby preserving the structural integrity of both machine and helmet. This easy application should provide for ready acceptance among motorcycle riders and for their enhanced safety.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. An example of such is the attachment of the proximity switch taught herein to the hand brake squeeze lever of the motorcycle. One of ordinary skill in art will observe that the proximity switch may, with equal effect, be disposed on the foot brake of the same motorcycle. Finally, while the present invention has been described in terms of its application to motorcycle riding, it will be apparent to the casual observer that the principles of the present invention may, with equal facility, be implemented on a wide variety of rider-operated equipment, vehicles and safety garb. By way of example, but not limitation, such equipment or vehicles could include snowmobiles, dune buggies, personal watercraft, as well as various race boats, cars, aircraft, and the like. Examples of alternative safety garb include, but are not limited to safety vests, spinal shields, life vests, life preservers, and the like. All such changes, modifications, alternative applications and combinations thereof are specifically contemplated by the principles of the present invention. The invention disclosed herein may be practiced without any element which is not specifically disclosed herein.

What is claimed is:

1. An improved safety helmet-mounted stop lamp system in operative combination with a vehicle having a brake system for stopping or slowing said vehicle by applying pressure to a lever mechanism disposed on said vehicle, said lever mechanism having a fixed and a movable portion, said stop lamp system further in operative combination with a safety helmet wearable by a user, said stop lamp system comprising:

switch means, in operative combination with an electrical power supply, for detecting movement of said movable portion of said lever mechanism;

coded infrared transmitter means, in operative combination with said switch means and said electrical power supply, said transmitter means, responsive to detection of movement of said movable portion of said lever mechanism by said switch means, for emitting an encoded infrared light emission;

a stop lamp attachable to said helmet;

coded infrared receiver means, further attachable to said helmet and in operative combination with said electrical power supply, for receiving said encoded infrared light emission over a large receiving angle during times of darkness as well as bright sunlight, for rejecting solar infrared energy, for decoding said emission, and, responsive to said decoding said emission, for energizing said stop lamp; and electrical connection means for electrically connecting said switch means, said transmitter means, said receiver means, and said stop lamp to said electrical power supply.

2. The improved safety helmet-mounted stop lamp system of claim 1 wherein said electrical power supply further comprises a first and a second electrical power supply and said electrical connection means further comprises a first and a second electrical connection means, said first electrical power supply and said first electrical connection means in operative combination with said transmitter means and said proximity switch, and said second electrical power supply and said second electrical connection means in operative combination with said stop lamp and said receiver means.

3. The improved safety helmet-mounted stop lamp system of claim 1 wherein said receiver means further comprises:

a receiver lens for receiving said encoded infrared light emission; and lightpipe means for receiving, over said large receiving angle, said encoded infrared light emission from said receiver lens, and for transmitting therefrom said encoded infrared light emission.

4. The improved safety helmet-mounted stop lamp system of claim 3 wherein said lightpipe means is a lightpipe having on least one end thereof ground diffuse.

5. The improved safety helmet-mounted stop lamp system of claim 3 wherein said lightpipe means further comprises a lightpipe having at least one end form selected from the group consisting of: partly cylindrical and partly bifurcated.

6. The improved safety helmet-mounted stop lamp system of claim 3 wherein said lightpipe means further comprises a lightpipe having at least one end thereof ground diffuse.

7. The improved safety helmet-mounted stop lamp system of claim 3 wherein said large receiving angle is approximately 180 degrees.

8. The improved safety helmet-mounted stop lamp system of claim 1 wherein said switch means further comprises a magnetic proximity switch in operative combination with said electrical power supply and having a switching part attachable to said fixed portion of said lever mechanism and having a movable actuating magnet attachable to said movable portion of said lever mechanism.

9. The improved safety helmet mounted stop lamp system of claim 1 wherein said stop lamp and said coded infrared receiver means are integrated into a helmet module which is readily attachable to said safety helmet without altering said safety helmet.

10. The improved safety helmet mounted stop lamp system of claim 1 wherein said vehicle further includes a vehicle brakelight system, and said coded infrared transmitter means and said switch means are attachable to said vehicle without altering said vehicle brakelight system.

11. The improved safety helmet-mounted stop lamp system of claim 1 further comprising a first electro-optic circuit in operative combination with said coded infrared transmitter means for transmitting a frequency modulated infrared transmission and a second electro-optic circuit in operative combination with said coded infrared receiver means for receiving said frequency modulated infrared transmission.

12. The improved safety helmet-mounted stop lamp system of claim 1 wherein said coded infrared receiver means further comprises a sunlight rejection filter.

13. The improved safety helmet-mounted stop lamp system of claim 12 wherein said sunlight rejection filter is selected from the group consisting of: interference filter and absorption filter.

14. The improved safety helmet-mounted stop lamp system of claim 13 wherein said interference filter is a multi-layered film filter.

15. The improved safety helmet-mounted stop lamp system of claim 1 wherein said vehicle is a motorcycle.

16. The improved safety helmet-mounted stop lamp system of claim 15 wherein said lever mechanism is selected from the group consisting of hand brake and foot brake.

17. The improved safety helmet-mounted stop lamp system of claim 9 wherein said helmet module is attachable to said helmet using double-sided tape.

18. The improved safety helmet-mounted stop lamp system of claim 1 wherein said switch means is attachable to said lever mechanism using double-sided tape.

* * * * *